United States Patent [19]

McFarland

[11] Patent Number: 4,478,090
[45] Date of Patent: Oct. 23, 1984

[54] DYNAMOMETER CONTROLLERS

[76] Inventor: Robert A. McFarland, 640 Survale, Ventura, Calif. 93003

[21] Appl. No.: 378,817

[22] Filed: May 17, 1982

[51] Int. Cl.³ .............................................. G01L 3/016
[52] U.S. Cl. .................. 73/862.09; 73/117.3
[58] Field of Search .................... 73/117, 117.2, 117.3, 73/862.09, 862.16, 862.17, 862.18; 364/511, 431.01, 431.11

[56] References Cited

U.S. PATENT DOCUMENTS

| 2,669,870 | 2/1954 | Bennett | 73/117.3 |
| 3,016,739 | 1/1962 | Jonach et al. | 73/117.3 |
| 3,864,965 | 2/1975 | Anderson | 73/862.18 |
| 3,906,437 | 9/1975 | Brandwein et al. | 364/511 X |
| 4,327,578 | 5/1982 | D'Angelo | 73/117 |

FOREIGN PATENT DOCUMENTS

25779  2/1979  Japan .............................. 73/862.09

Primary Examiner—Charles A. Ruehl
Attorney, Agent, or Firm—Browdy and Neimark

[57] ABSTRACT

A dynamometer controller comprising circuit means for accomplishing numerous improvements including means to convert the reactive load cell torque value into a true torque value instantaneously using an extremely simple passive circuit; a three mode controller including improved integration means to prevent reset windup and a dual mode operation to permit automatic shifting of the dynamometer between its motor and engine modes while preventing oscillations in the system when this occurs; improved means to drive the displays in the performance monitor by blanking one or two of the last significant digits selectively, as well as other improvements.

13 Claims, 10 Drawing Figures

$T_{INERTIA} = I_{ROTOR} \times \alpha_{ROTOR}$ $T_{SHAFT} = T_{REACTIVE} + T_{INERTIA}$

DYNAMOMETER CONTROLLERS

FIELD OF THE INVENTION

This invention relates to electronic apparatus for controlling the operation of dynamometers.

Most generally, a dynamometer is a machine for measuring energy. More specifically, in the environment of the present invention, a dynamometer is, in effect, a relatively large heavy duty electric machine which can be operated as either a motor or as a generator. This machine is directly coupled to an engine being tested, and can be used in either engine mode or motor mode. In motor mode the dynamometer drives the engine, and in engine mode the engine drives the dynamometer. In both cases, numerous parameters of the performance of the engine can be tested, such as horsepower, braking ability, exhaust emissions, and numerous other parameters around the engine, as is well known to those skilled in these arts. Dynamometer testing is most often applied to larger engines used for industrial purposes such as oil rigs, heavy duty trucks, and the like, and to high performance engines such a racing car engines, as well as in government testing, such as the dynamometer sequences which produce the EPA ratings of new automobiles. Thus, the use of dynamometers is quite wide spread, and there is a significant need for controllers for such dynamometers.

PROBLEMS IN THE PRIOR ART AND ADVANTAGES OF THE INVENTION

Prior art controllers have numerous problems which are overcome by the present invention. These problems include that the controller must be custom made or matched to the particular dynamometer which it is being used to control. This is a disadvantage since the dynamometer owner is limited to buying his controller only from the manufacturer of the dynamometer itself. Often times, because of this captive market, the dynamometer manufacturer is not motivated to make improvements in the controller, since his primary product is the dynamometer itself.

However, most of the dynamometers in use fall into one of two different types, the eddy current or the water brake type. The invention is particularly adapted to accommodate these two types, although it can control the operation of all types of dynamometers. In the eddy current type, the controller operates on the electrical energy to or from the dynamometer, and in the water brake type it operates on the water valves of the dynamometer. There are sub-types of these two main types of dynamometers commercially available, and the invention controller can operate with all of these sub-types.

Another problem in the prior art solved by the present invention is accuracy or precision. The present invention controller can hold the dynamometer to within one RPM and to 0.01% of the load or current controlled. This is a large improvement over the precision and accuracy of prior art controllers.

The invention controller also provides improvements in the area of speed or response, that is, the time required for the controller to bring the dynamometer to a predetermined set speed. This, of course, is also a function of the characteristics of the dynamometer itself, although in typical cases speed of response on the order of 700 RPM's per second are obtained, typically.

Another improvement of the invention pertains to built in interfaces to interconnect the controller with other control devices, such as external RPM, load, and throttle controllers.

Another advantage of the invention is that it provides a single modular device completely preassembled, in a highly reliable manner, and ready for use by the dynamometer user by simply plugging it in. Heretofore, especially where the controller was built into and made part of the dynamometer itself, this advantage was completely unknown. Another important advantage of the invention resides in its improved noise immunity. The present invention, in common with all dynamometer controllers, works in an extremely "noisy" environment. The noise referred to is both sonic noise as well as electrical noise, both of which are caused by the relatively large dynamometer itself, the sometimes even larger and heavier internal combustion engines, both diesel and gasoline, on which such dynamometers are used, as well as ignitions, heavy relays which open and close thereby creating large high voltage sparks, general high voltage conditions in the area, and the like, all of which contribute to both the physical and electrical noise within which the invention must operate. Insulating the critical parts of the control circuitry from this noise is very important in that the output results are only as good as the input raw data on which those results are based. The invention provides important advantages in the area of protecting the circuitry from this noise and thereby enhancing the output results, i.e., the accuracy and precision, of the present invention.

Other important advantages of the invention reside in the manner of construction, namely, the provision of all normal calibration adjustments from the front of the instrument by removal of the name plate, and very high reliability of the circuitry by the virtual elimination of manual wiring. Almost all of the circuitry is provided on a single printed circuit board.

Every dynamometer includes means to sense the torque. One very popular type of torque sensor provided by many dynamometer manufactures is known as the load cell type which is mounted on an external arm of the casing of the dynamometer. Load cells have many advantages and are thus popularly used. However, load cells have one important disadvantage which is overcome by the present invention controller. Load cells are only indirectly responsive or reactive to the shaft torque as transmitted to the cell via the armature and the field of the dynamometer. This indirect reaction becomes especially problemsome during accelerations and deaccelerations of the engine since the torque sensed at the load cell is not in fact equal to the engine torque because of the delay time necessary to overcome the inertia of the dynamometer.

The present invention provides means in the controller to correct for this inherent disadvantage of load cell type torque sensors so that they become, in effect, instantly responsive to the shaft torque between the engine and dynamometer. Other types of torque sensors, known as shaft torque sensors are directly responsive, but have other disadvantages as compared to the load cell type of sensor. Thus, this portion of the invention provides for the correction of the one disadvantage of the load cell type sensor so as to thereby make it equivalent, and in fact overall better, than the shaft torque type sensor. This is a significant step forward in the art made by the present invention.

The invention was developed from a predecessor form of controller which included the feature of a single display operated by a selector switch to thereby display numbers corresponding to any one of a plurality of selected parameters around the system being controlled. The invention makes improvements in this area as to the ease of use and readability of the display. These improvements comprise means to permit the operator to move the decimal point at will to any position among the digits of the display. Further, the improvement includes means to selectively disable one or both of the last two significant digits in the display, as when the total number of digits for a particular parameter are smaller in one case than they are in another.

BRIEF DESCRIPTION OF THE DRAWINGS

The above and other advantages of the invention will be pointed out or will become evident in the following detailed description and claims, and in the accompaying drawing also forming a part of the disclosure, in which:

DETAILED DESCRIPTION OF THE DRAWINGS

Figure 1:
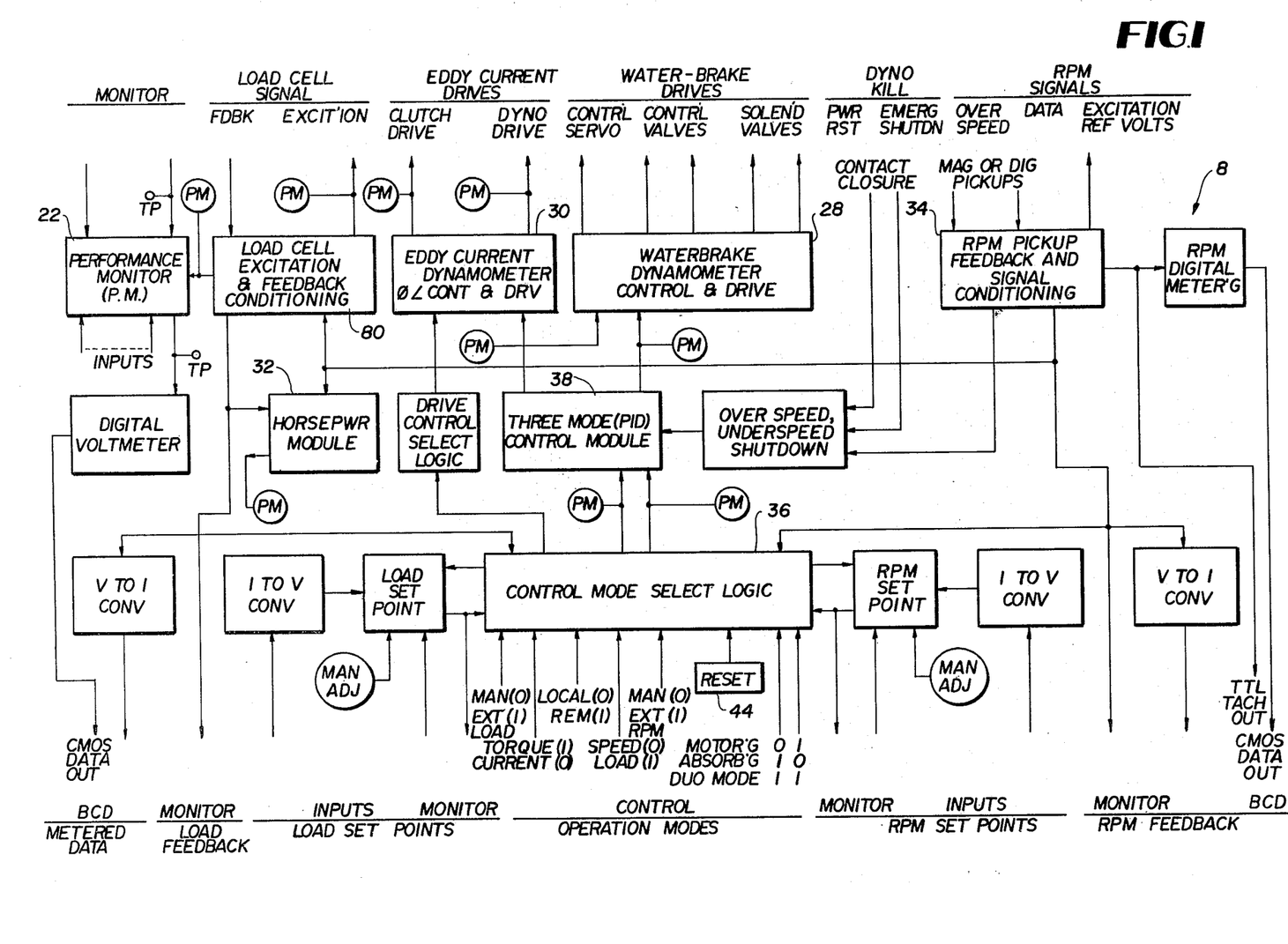
FIG. 1 is an overall block diagram of a dynamometer controller embodying the invention.
Figure 3:
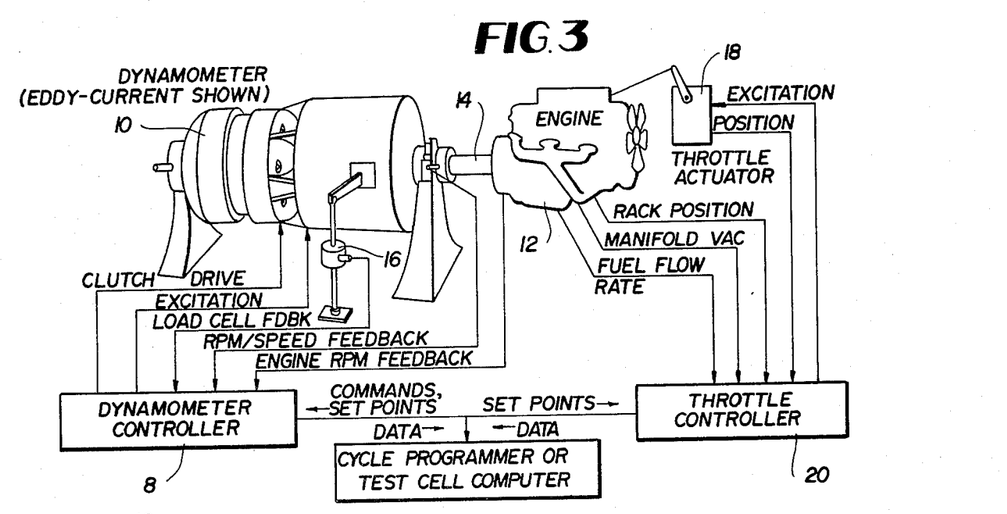
FIG. 3 is a partially perspective view and a partially block diagram showing the environment of an engine and a dynamometer with which the invention controller is used.

Referring now to FIGS. 1 and 3, reference numeral 8 indicates the invention controller overall. Referring to FIG. 3, the environment of the invention includes a dynamometer 10 coupled to an engine 12 by a shaft 14, the dynamometer 10 being of the eddy current type by way of example. A load cell 16 is provided for measuring the torque of the dynamometer. A throttle actuator 18 physically operates the throttle of the engine 12 under the commands of the throttle controller 20. The numerous legends on FIG. 3 make it self-explanatory in setting forth its example of one installation in which the invention can be used.

Referring now to FIG. 1, the presentation of controller 8 therein is arranged so that the inputs, that is the setting of the controls by the operator as well as certain feedbacks, set points, and the like are arranged along the bottom of the drawing. Along the top are the outputs from the controller to the dynamometer, the engine and the load cell or other torque sensor.

Figure 2:
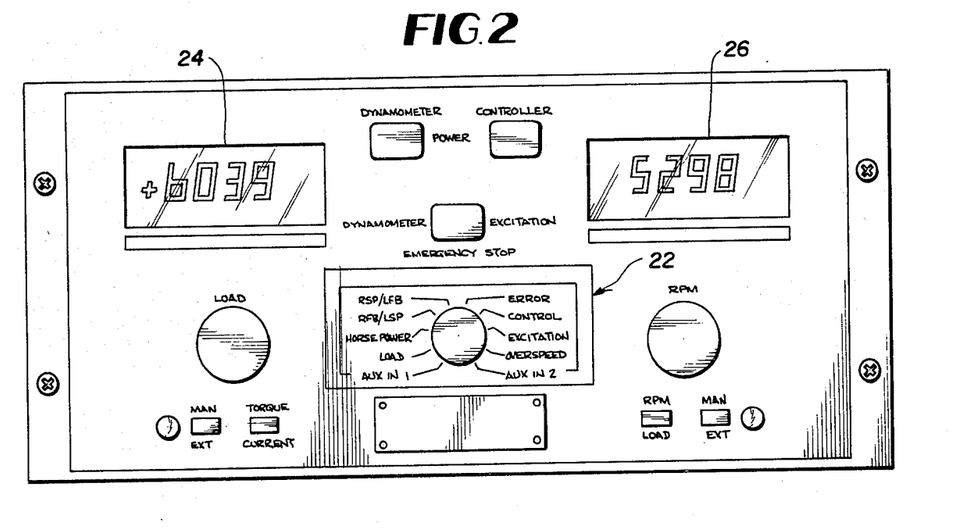
FIG. 2 is a front elevational view of a control panel of a controller embodying the invention.

Starting in the upper left hand corner, the block 22 marked "performance monitor", also shown in FIG. 2, is a part of the invention which permits the left hand or load display 24 in FIG. 2 to display numerous other values sensed around the system, i.e., horsepower, excitation, overspeed, and the like, all of which are indicated by the legends on the performance monitor dial in FIG. 2. Other points in the overall controller 8 which have this ability are indicated in FIG. 1 by the designation "PM" (for performance monitor), the letters being enclosed in a circle. The right hand display 26 always displays the RPM. The other push buttons and the two knobs on the controller in FIG. 2 are marked with self-explanatory legends.

Block 28 in the upper center part of FIG. 1, as indicated by the relatively large number of arrows across its top, is the way in which the invention controller accommodates itself to all the different types of water brake type dynamometers. For example, some water brake dynamometers use servos, some use solenoid valves, some have control valves, some are controlled by changes in voltage, some by changes in amperage, and all of the various types of water brake dynamometers can be accommodated by the circuitry of block 28. Likewise, block 30 accommodates the invention to the different types of eddy current dynamometers.

Block 32, which receives inputs from the load cell and from the RPM pick up block 34 is a simple dedicated calculation block, it calculates horsepower data put out to the performance monitor block 22 upon demand, based on the two parameters of load or torque and RPM.

Block 36 is the logic control mode selector, most of the inputs of which are the switches and push buttons of FIG. 2 as well as other internal inputs and feedbacks, all of which are indicated in FIG. 1 and marked in a self-explanatory manner.

Another block 38 is the invention three mode controller. All of the other blocks, unnumbered, are marked in a self-explanatory manner. All of the blocks along the bottom of the drawing in line with the block 36 are required primarily to interface the invention controller with other pieces of equipment, and comprise current to voltage or voltage to current converters.

Figure 4:
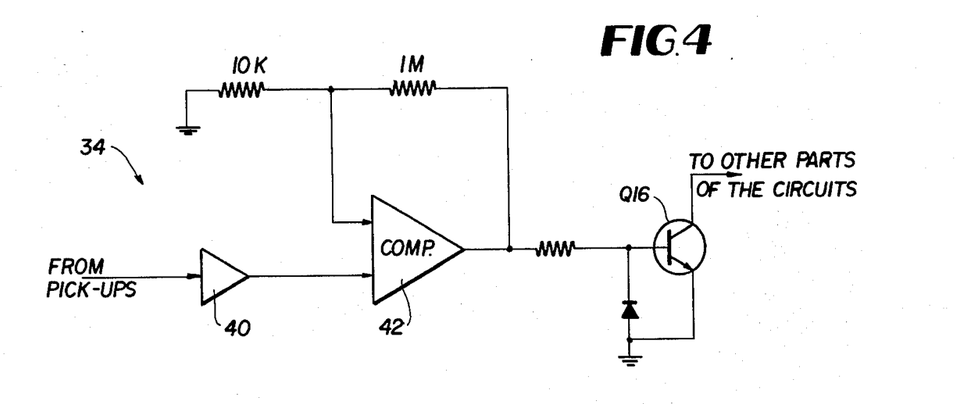
FIGS. 4–7 and 9 and 10 are detailed electrical schematic drawings of various parts of the controller shown in FIG. 1.

Referring now to FIG. 4, a portion of the RPM circuitry of block 34 is shown in detail. This part of the invention provides improvements in the area of noise suppression, i.e., protecting the remainder of the circuitry fed from the block 34 from the noise of the environment in which the invention operates. As discussed in the introductory portion above, the invention operates in an extremely noisy environment both physically and electrically. The electrical noise, caused by the ignitions of the heavy machines in the area, the open and closing of heavy duty relays which create large high voltage sparks, other general high voltage conditions, and the like, all would have an extremely large detrimental effect on the quality of the RPM data output from this block 34. Since RPM is an extremely critical value on which many other calculations and determinations depend, the quality of this signal as to its noise content is very important. Referring now in detail to FIG. 4, block 40 is a differential amplifier which removes common mode noise, does a low pass filtering operation, and passes on the signal to a comparator 42. The second imput to the comparator 42 is a feedback or hysteresis signal made up of a ratio of a ground potential compared to the output of the comparator in the ratio of 100 to 1. This is accomplished by the values of the two resistors in the hysteresis loop as shown. The transistor Q16 acts as an output buffer for the output signal from the comparator 42, the array of the resistor and diode, unnumbered, serving the usual linking and protective functions in such circuits.

Thus, this part of the circuitry achieves an improved noise immunity by providing a transistor buffer to a hysteresis feedback arrangement on a voltage comparator in the manner shown.

Figure 5:
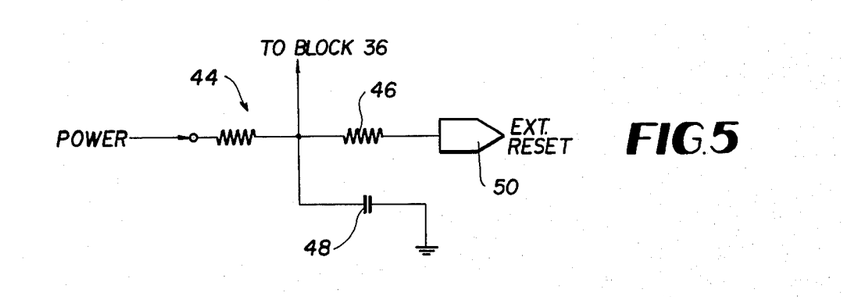

Referring now to FIGS. 1 and 5, in reset 44, the invention also includes improved means for filtering noise out of the external dynamometer power reset means. These means, referring to FIG. 5, comprise an RC circuit made up of a resistor 46 and a capacitor 48 positioned between the circuit and the control mode selector logic block 36.

Figure 6:
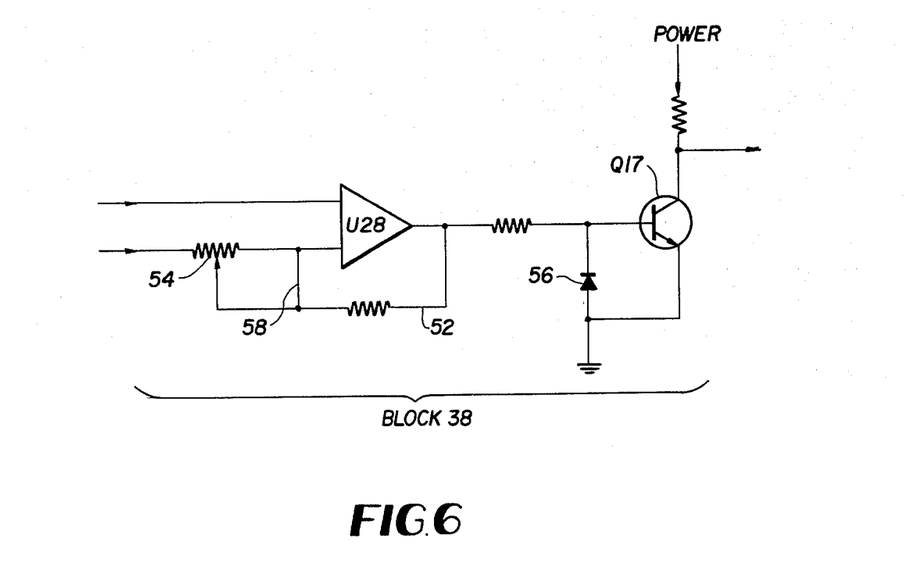

Referring now to FIG. 6, the invention circuitry includes a portion which permits automatic transfer from one mode of operation to the other, including means to prevent the system from oscillating back and forth between engine and motor modes. This is called the duo-mode operation of the present invention. The means to prevent the oscillation comprises a hysteresis loop.

Referring now in detail to FIG. 6, these means comprise an integrated circuit U28 and a transistor Q17, the output of the integrated circuit comprising the input to the base of the transistor. The hysteresis is provided by a feedback loop 52 which includes a potentiometer 54 on one of the inputs to the integrated circuit U28. The jumper wire 58 in parallel with the potentiometer 54 configures the potentiometer as a rheostat rather than as a conventional voltage divider or potentiometer configuration. The transistor Q17 serves to buffer the output of the integrated circuit U28 which performs the duo-mode function, and the diode 56 serves to protect the transistor Q17 against a reverse bias which could otherwise possibly damage the transistor.

Thus, it is the combination of the adjustable hysteresis loop 52 including the potentiometer 54 functioning as a rheostat on one of the inputs to the integrated circuit U28, the output of which is buffered as at Q17, which provides the variable hysteresis adjustment to permit operation of the three mode controller block 38, see FIG. 1, in this manner to permit the dual functioning of the invention automatically between the two modes of operation of the dynamometer. The hysteresis adjustment prevents the system from oscillating back and forth between engine and motor modes of operation of the dynamometer.

Figure 7:
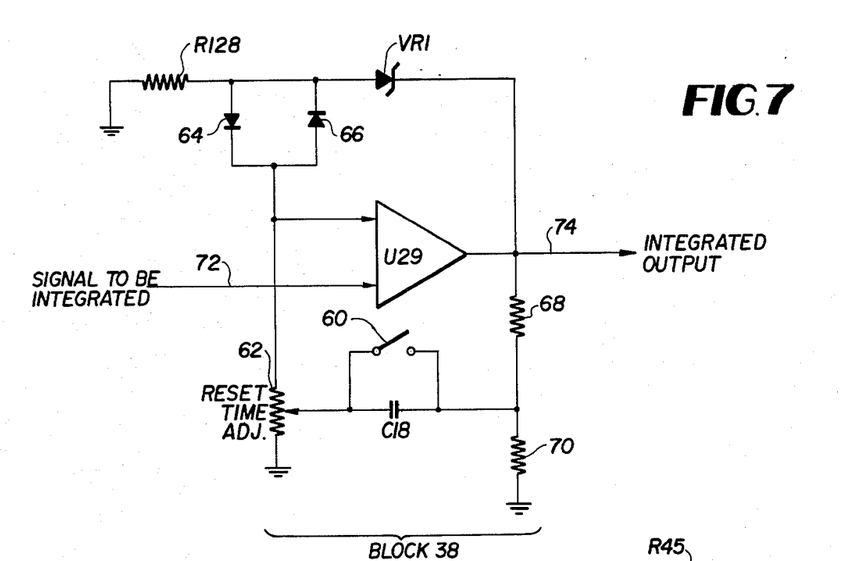

Referring now to FIG. 7, another part of the three mode controller block 38 is shown. In this part of the circuitry, the signal on the output line 74 is to be equal to the input signal on the line 72 plus the integral of the input times a fixed gain. This part of the invention circuitry is the solution to a problem in the prior art known as reset windup. This part of the circuitry keeps the inputs to the integrated circuit U29 and to the capacitor C18 within the range of the integrated circuit U29. In the successfully constructed embodiment, this integrated circuit U29 has a range of from zero to ten volts. If the input on the line 72 exceeds 10 volts, then no further meaningful results will be achieved beyond that value. The same is true with negative voltage values below zero. The array of the parts of resistor R128, the two diodes arranged in a "back-to-back arrangement" 64 and 66, and the Zener diode VR1, all together prevent this phenomenon. These function, in general, by selecting the value of the Zener diode, VR1 to be equal to the overload value of the integrated circuit U29. Thus, when the output voltage on the line 74 exceeds the maximum (10 volts) of the integrated circuit U29, the Zener diode will break down and allow the appropriate one of the two diodes 64 and 66 to conduct and thereby provide an alternate current path. That is, a current path alternate to the one including the capacitor C18. The two diodes 64 and 66, of course, operate one for positive values and the other for negative values, but operate generally in the same manner. Thus, this portion of the three mode controller 38 prevents saturation and corresponding harmful, even physically damaging and harmful, overloading of the integrated circuit U29. Further, absent the protective functioning of the circuit including the Zener diode VR1, the capacitor C18 would discharge, thus greatly increasing the recovery time of the circuit. The circuit, in effect, turns the integrated circuit U29 from a straight integrator into a buffer in the voltage overload zone. The charge is maintained on the capacitor C18, and recovery time becomes virtually instantaneous as soon as the overload on the input line 26 drops.

The purpose of the switch 60 in parallel across the capacitor C18 is to make the output of the circuit of FIG. 7 equal to only the input voltage times a fixed gain. The manner of operation is to facilitate validation of the integration function (by disabling it and noting the effect), and to provide for certain types of water brake dynamometers which mechanically provide the integration function. These types of water brake dynamometers cannot be properly controlled if two integrator functions were present in the control loop (one mechanical and one electrical).

The array of parts including the two diodes 64 and 66 and the resistor R128 provides the means of isolating the reset time adjusting potentiometer 62 from current leakages through the Zener diode VR1. These leakage currents would otherwise cause a temperature dependent offset problem unless they can be isolated from the potentiometer 62. As explained above, the Zener diode VR1 is used in this regard to limit the positive and negative voltage outputs of the integrated circuit U29. The Zener diode VR1 is forward biased for negative outputs of U29 exceeding the two diode forward voltages. This has the effect of limiting the negative output swing of integrated circuit U29 to about minus 1.5 volts. The Zener diode VR1 also breaks down when the output of integrated circuit U29 exceeds the Zener voltage value (which is selected to be about 10 or 11 volts), which has the effect of limiting the output of the integrated circuit U29 to 11 or 12 volts, correspondingly. Thus, considered overall, in the successfully constructed embodiment, the diodes 64 and 66 in FIG. 7 provide an alternate feedback path around the integrated circuit U29 which limits the normal linear range of operation to approximately minus 1.5 to plus 11 volts. Since the circuitry which is fed by the output of integrated circuit U29, in the successfully constructed embodiment, is only active in the region of zero to ten volts, this limiting action prevents wasted time and possible non-linear operation outside the region of interest. The integration is stored on the capacitor C18, which is one of the two feedbacks to the integrated circuit U29.

Thus, it can be seen that the integrated circuit U29 has a dual feedback loop from its output to a second one of its inputs, the first of its inputs being the input line 72 delivering signals to be integrated. One branch of this dual feedback loop comprises the capacitor C18 and the adjusting potentiometer 62. The second arm or branch of the dual feedback loop comprises the parallel array of the two diodes 64 and 66 in series circuit with the Zener diode VR1.

Figure 8:
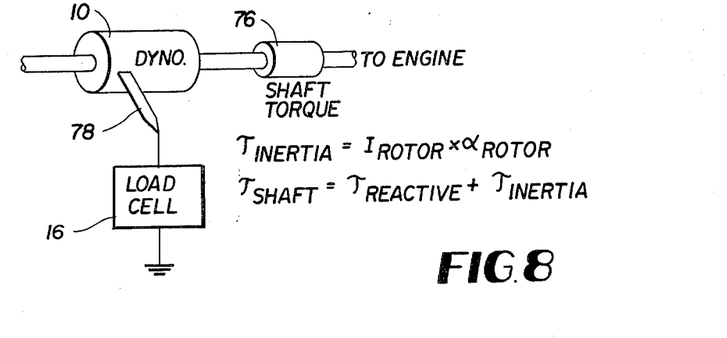
FIG. 8 is a schematic showing of the load cell of the dynamometer and the equation illustrating an important advantage of the invention.

Referring now to FIG. 8, there is shown a hypothetical situation wherein a dynamometer is functioning with the two popular types of torque sensors, a load cell such as the load cell 16 of FIG. 3, and a shaft torque sensor indicated at 76. This is of course quite hypothetical, in any real life environment a particular dynamometer will only have one or the other of the load cell or the shaft types of torque sensors. As set forth in the introductory portions above, the load cell includes an external arm 78 on the casing of the dynamometer proper 10. This type of torque sensor has many advantages and is very popularly used, but it has an important disadvantage in that it is only indirectly reactive to the shaft torque that is transmitted to it via the armature and the field of the dynamometer. This creates numerous problems, especially serious during accelerations and deaccelerations of the dynamometer because the torque sensed at the load cell 16 is not truly equal to the engine torque because of the time necessary to overcome the inertia of the dynamometer rotor. The shaft torque-type sensor 76 overcomes this problem in that it is, since it is on the shaft itself, directly responsive. However, shaft torque types have other disadvantages making them less popularly used than the load cell type.

Figure 9:
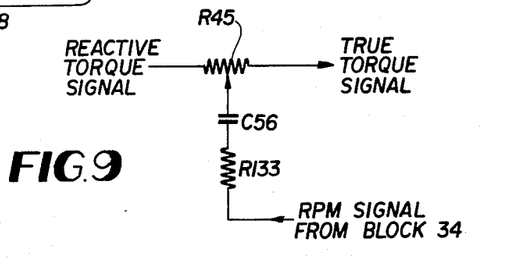

The invention circuitry in FIG. 9, which corresponds to block 80 in FIG. 1 labeled "load cell excitation and feedback conditioning", solves this problem and in effect converts the reactive and delayed torque signal which is produced by the load cell 16 into a true torque signal, and does so instantaneously at the speed of the electronics.

The invention accomplishes this and achieves this very substantial step forward of making a load cell type sensor truly instantanously reactive to shaft torque, rather than indirectly responsive, by using the equations set forth in FIG. 8 and the circuitry in FIG. 9 to implement these equations. The relationship is that the shaft torque of the rotor is equal to the moment of inertia of the rotor times the acceleration of the rotor. The equations will accomplish the result whether the engine-dynamometer set is accelerating or deaccelerating from the measured torque at the load cell to determine the shaft torque instantaneously.

A key part of the circuitry of FIG. 9 which allows it to calculate the equations set forth in FIG. 8 is that acceleration is the derivative of speed, and thus the RPM signal from block 34 fed into the capacitor C56 permits the creation of a signal proportional to the parameter of acceleration needed to carry out the equations.

The circuitry of FIG. 9 accomplishes this in a completely passive manner, that is, no active electronics which is an extremely great step forward for the invention. In this manner, a highly reliable and simple circuit can be provided to achieve the results.

Referring to FIG. 9, the circuit comprises a very simple array of a potentiometer R45, a capacitor C56, and a protective resistor R133 which serves a current limiting function only. The potentiometer R45 does double service in the circuit because it adds the reaction torque signal and the inertia torque signal and its initial setting also compensates for the value of the the moment of inertia of the rotor of the dynamometer, and is a one time setting for any particular machine with which the invention controller is used. In operation in carrying out the equations, however, there is a quite complex flow trading off and feeding back and forth of the various signals and values between the two major components R45 and capacitor C56 to perform these two functions. In any event, the net result is that if one of these signals is held constant, as by the reactive torque signal feeding into R45 or the RPM signal from block 34 feeding into capacitor 56, then as a result the output will always be the true torque signal in accordance with the equations set forth in FIG. 8 and described above. Thus, the two functions go on simultaneously, however, if one value changes and the other is held constant, still the output result is correct, i.e., a signal instantaneously representative of the true torque.

Figure 10:
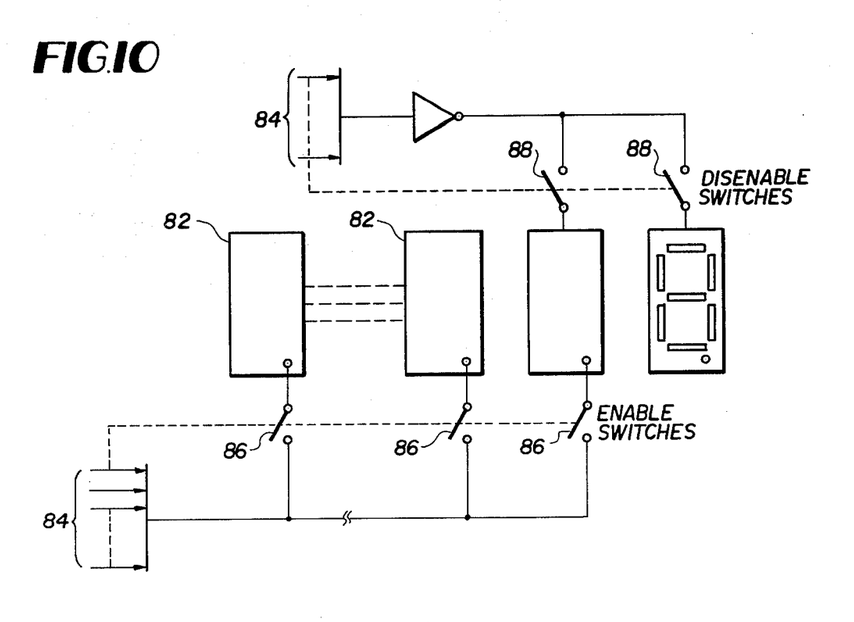

FIG. 10 shows a modification of the performance monitor 22 shown in FIG. 2. Overall, this part of the invention circuitry pertains to the drive to the digital display wherein the operator is given the flexibility of moving the decimal point within the various digits of the display, and is further given the ability to disable one or both of the last two significant digits in the display. This later feature is important where rapidly changing signals could distract or confuse the operator, and the operator is better served by the invention controller by having only the more significant digits displayed, i.e., the possibility of his being confused by the rapidly changing fourth or fifth decimal place numers is eliminated. Further, this portion of the circuitry includes means for driving this part of the invention circuitry, that is the part pertaining to versatility of the displays, in cooperation with any one of the positions on the performance monitor 22.

In FIG. 10, the individual digits are indicated by the blocks 82, the drawing having been made to indicate that the invention can operate with any number of such digits in a particular display. The arrows 84 inputting to the displays via the enable switches 86 and the disenabled switches 88 indicate the numerous positions on the performance monitor 22. The dotted line going from these arrows to the switches indicates that certain positions of the performance monitor will enable or disenable varying numbers of the digits of the display. For example, in the preferred embodiment of the invention which has been built three parameters in particular have a potential problem, that is, they are particularly sensitive to vibration, and have the capability of causing rapid changes in the least significant digits. It is the function of this part of the invention circuitry to eliminate that undesirable display. These three parameters are manual load set point, load, and horsepower. Some ones or the others of the arrows 84 indicate various ones of those parameters, and the dotted line connections indicate that one or two of the least significant digits can be enabled or disenabled by operation of the switches 86 and 88. That is, for example, it may be that in one position of the performance monitor corresponding to one of the arrows 84, both disenable switches 88 will be activated thus blanking the last two significant digits. Another parameter represented by another arrow 84 may operate only one of those two switches 88. The switches 86 are also operated correspondingly as needed.

Thus, this portion of the invention is directed to a combination of a performance monitor, that is a single display operated from a selector switch and adapted to sense many parameters around a large system, together with means, operated by the selector switch, to blank certain one(s) of tbe digit(s) of the display when the display is displaying numbers corresponding to such selected parameters.

Thus, as is clear, each of the individual digit 82 includes a decimal point. The particular arrow 84 not only operates the disenable switches 88, one, both or neither of them as required, but it also operates any particular one of the enable switches 86 which enables the decimal point of the particular one digit display 82 thus selected. In this manner, this part of the invention circuitry accomplishes two functions, the disenable switches 88, disenable one, or both, or neither of the last two significant digits, and the enable switches 86 enable one particular decimal point, both of which positions can be predetermined by suitable jumper wires and the like dependent upon the particular parameter representative of the particular arrow 84 then in use.

This aspect of the invention, that is the display control of FIG. 10, as well as all of the other aspects in the preceding figures, each have utility other than in conjunction with a controller for dynamometers. For example, electronic displays made up of a plurality of individual digits are found in an enormous number of different sorts of electronic equipment. The various integrator circuits, noise suppression means, and the like of the previous figures described above, likewise have utility in wide ranges of applications, all of which will present themselves to those skilled in various different arts and the electronics arts in which they may be used.

While the invention has been described in detail above, it is to be understood that this detailed description is by way of example only, and the protection granted is to be limited only within the spirit of the invention and the scope of the following claims.

I claim:

1. A controller circuit for a dynamometers comprising a plurality of pick-ups, said circuit comprising noise suppression means between each pick-up and other portions of the circuit, said noise suppression means comprising a voltage comparator, means to feed a signal from each said pick-up to said voltage comparator as one of the input signals to said voltage comparator, a hysterisis feedback loop to cause the output of said voltage comparator to be another input to said voltage comparator, and a transistor buffer to output the output signal of said voltage comparator to other portions of said dynamometer controller circuit.

2. The circuit of claim 1, wherein said hysterisis feedback loop comprises a voltage divider circuit, whereby the amount of hysterisis signal is determined by said voltage divider circuit.

3. The circuit of claim 1, said means to feed a signal from each said pick-up to said voltage comparator comprising differential amplifier means, said differential amplifier means performing a low pass filtering operation and removing common mode noise from each pick-up signal.

4. A controller circuit for a dynamometer compising a three mode controller portion, said three mode controller comprising means to permit said controller to control said dynamometer in one of motor mode, wherein the dynamometer drives the engine being tested, or in engine mode wherein said engine drives said dynamometer, or in a dual mode wherein automatic transfer can be done wherein the testing shifts automatically between engine and motor modes, said circuit further comprising means to instantaneously convert a signal representative of reactive shaft torque into a signal representative of true shaft torque, and means to feed said true shaft torque signal to said three mode controller portion.

5. The dynamometer controller circuit of claim 4, wherein said three mode controller dual mode comprising means to permit automatic transfer between engine and motor modes of operation of said dynamometer while at the same time preventing oscillations in the operation of said dynamometer, said last mentioned means comprising an integrated circuit and a hysterisis loop from the output of said integrated circuit to one of the inputs to said integrated circuit, and said hysterisis loop comprising rheostat means, whereby the feedback in said hysterisis loop is variable and can be controlled by said rheostat means.

6. The circuit of claim 5, wherein said rheostat means comprises a potentiometer and a jumper wire, whereby said potentiometer is caused to function as a rheostat rather than as a voltage divider.

7. The circuit of claim 5, and a transistor buffer on the output of said integrated circuit to feed the output signals from said integrated circuit to other portions of said circuit.

8. In a controller circuit for a dynamometer, means to prevent reset windup to an integrator circuit, said preventing means comprising an operational amplifier circuit between an input line comprising one of the inputs to said integrator circuit on which signals to be integrated are provided to said operational amplifier circuit and an output line from said operational amplifier circuit, a dual feedback loop between the output of said operational amplifier circuit and another input to said operational amplifier circuit; one branch of said dual feedback loop comprising capacitor means between said output line of said operational amplifier circuit, said another input to said operational amplifier circuit, and a potentiometer between said another input and ground; and the other branch of said dual feedback loop comprising a Zener diode in series circuit with a parallel circuit arrangement of a pair of diodes arranged back to back in inverse polarity.

9. The circuit of claim 8, and a switch arranged in parallel with said capacitor means only of said one branch of said dual feedback loop.

10. The circuit of claim 8, said Zener diode having a breakdown voltage of a predetermined value, said operational amplifier circuit having an operating range of voltage output values, and said inverse polarity diodes in said other branch of said dual feedback loop having predetermined values, whereby when the value of the output signal exceeds the operating range of said operational amplifier circuit, said Zener diode will break down to create an alternate path including said inverse polarity diodes for such overload signals, and said inverse polarity arrangement of said diodes permitting creation of said alternate current path for overload voltages which exceed either the upper or the lower end of the range of operation of said operational amplifier circuit.

11. The circuit of claim 8, said dual branches of said feedback loop comprising alternate current paths, the values of the components in said circuit including said capacitor means, said Zener diode, the operating range of said operational amplifier circuit, and said inverse polarity diodes, being selected such that said alternate paths will come into being when the output of said operational amplifier circuit exceeds either the upper or the lower end of the end operating range of said operational amplifier circuit; whereby said operational amplifier circuit functions as a buffer when overloaded due to the alternative feedback path created by said Zener diode and said inverse polarity diodes.

12. The circuit of claim 8, said operational amplifier circuit having an operating range of approximately zero to plus ten volts, said Zener diode having a breakdown voltage of approximately ten volts, whereby said Zener diode breaks down when output voltages exceed the upper end of the operating range of said operational amplifier circuit, and whereby one or the other of said inverse polarity arrangement of said diodes in parallel with each other and in series with said Zener diode will permit creation of an alternate current path in the event the output voltage from said operational amplifier circuit goes beyond the operating range of said operational amplifier circuit, and whereby said operational amplifier circuit functions as a buffer when said output voltage is in the overload zones both below and above the operating range of said operational amplifier circuit.

13. In a dynamometer having a load cell type torque sensor, said sensor comprising means to measure reactive shaft torque, means to produce a signal proportional to said measured shaft torque, a circuit comprising means to instantaneously convert said measured reactive torque signal into a signal representative of true shaft torque, said converting means in said circuit comprising means to calculate the equation: true torque equals reactive torque plus the moment of inertia of the rotor of said dynamometer times the acceleration of said dynamometer rotor, said circuit means for calculating true torque comprising a capacitor and a potentiometer, said capacitor being of a predetermined value, means to feed signals proportional to the RPM of said dynamometer to one side of said capacitor, means to connect the other side of said capacitor to the movable wiper of said potentiometer, and means to feed signals from said load cell representative of the reactive torque sensed at said load cell to one side of the coil portion of said potentiometer, whereby the signal at the other end of the coil portion of said potentiometer is representative of the true torque of said dynamometer rotor instantaneously in real time, whereby a setting of the potentiometer movable wiper can be chosen proportional to the moment of inertia of said dynamometer rotor and whereby a potentiometer movable wiper setting can be preset to calibrate said true shaft torque circuit means with respect to the dynamometer's rotor inertia.

* * * * *